(12) United States Patent
Nosaka

(10) Patent No.: US 9,296,307 B2
(45) Date of Patent: Mar. 29, 2016

(54) CHARGING APPARATUS AND VEHICLE

(75) Inventor: Shigekiyo Nosaka, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 194 days.

(21) Appl. No.: 14/131,315

(22) PCT Filed: Jul. 5, 2012

(86) PCT No.: PCT/JP2012/004385
§ 371 (c)(1),
(2), (4) Date: Jan. 7, 2014

(87) PCT Pub. No.: WO2013/008429
PCT Pub. Date: Jan. 17, 2013

(65) Prior Publication Data
US 2014/0159659 A1  Jun. 12, 2014

(30) Foreign Application Priority Data

Jul. 14, 2011  (JP) .................................. 2011-155336

(51) Int. Cl.
*H02J 7/00* (2006.01)
*H02H 3/00* (2006.01)
(Continued)

(52) U.S. Cl.
CPC ......... *B60L 11/1846* (2013.01); *B60L 11/1818* (2013.01); *B60L 11/1825* (2013.01);
(Continued)

(58) Field of Classification Search
CPC ............ B60L 11/1809; H04L 41/0672; H04L 67/125; H02J 7/0042; H02J 7/0052
USPC ................................. 320/109; 701/22; 361/69
See application file for complete search history.

(56) References Cited

U.S. PATENT DOCUMENTS 8,106,627 B1 * 1/2012 Rossi .................. B60L 11/1816
    307/18
8,324,859 B2 * 12/2012 Rossi .................. B60L 11/1824
    307/18
(Continued)

FOREIGN PATENT DOCUMENTS

CN       101356705 A     1/2009
CN       102106056 A     6/2011
(Continued)

OTHER PUBLICATIONS

Extended European Search Report dated Sep. 11, 2014, for corresponding EP Application No. 12811439.4-1804 / 2733815, 7 pages.
(Continued)

*Primary Examiner* — M'Baye Diao
(74) *Attorney, Agent, or Firm* — Seed IP Law Group PLLC

(57) ABSTRACT

Disclosed is a charging apparatus whereby charging can be suitably performed even in the cases where a plurality of electric vehicles are connected to a charging station. The charging apparatus has: a charging cable (4), which is configured of a power supply line (6) that charges an electric vehicle (2) and a pilot line (8) that detects connection of the electric vehicle (2); a power supply unit (10), which supplies power to the charging cable (4); a voltage detecting unit (11), which detects, via a pilot line (8), a voltage pattern that corresponds to identifying information of the electric vehicle (2); and a power line communication unit (12), which performs, with the electric vehicle (2), data communication in the state wherein the identifying information of the electric vehicle (2) is added, said identifying information having been acquired by means of the voltage detecting unit (11).

17 Claims, 7 Drawing Sheets

(51) Int. Cl.
  B60L 11/00 (2006.01)
  B60L 11/18 (2006.01)
  H01M 10/44 (2006.01)
  *H02J 13/00* (2006.01)

(52) U.S. Cl.
  CPC ......... *B60L11/1838* (2013.01); *B60L 11/1861* (2013.01); *H01M 10/441* (2013.01); *B60L 2230/12* (2013.01); *B60L 2230/16* (2013.01); *H01M 2220/20* (2013.01); *H02J 7/0027* (2013.01); *H02J 13/0003* (2013.01); *Y02T 10/7005* (2013.01); *Y02T 10/7055* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 8,692,513 | B2 | 4/2014 | Gaul et al. |
| 8,698,642 | B2 * | 4/2014 | Taguchi ............... B60L 3/12 340/636.1 |
| 8,761,983 | B2 * | 6/2014 | Nonaka ............. B60L 11/1816 307/10.1 |
| 8,860,559 | B2 * | 10/2014 | Ichihara .................. H04B 3/54 340/12.32 |
| 2003/0107481 | A1 | 6/2003 | Sawafuji |
| 2009/0174365 | A1 * | 7/2009 | Lowenthal .......... B60L 11/1816 320/109 |
| 2009/0278492 | A1 | 11/2009 | Shimizu et al. |
| 2010/0145568 | A1 * | 6/2010 | Watanabe ............. G07C 5/085 701/29.6 |
| 2010/0268411 | A1 * | 10/2010 | Taguchi .............. B60L 11/1809 701/31.4 |
| 2011/0121779 | A1 | 5/2011 | Ichikawa et al. |
| 2011/0144823 | A1 | 6/2011 | Muller et al. |
| 2012/0092141 | A1 * | 4/2012 | Ichihara .................. H04B 3/54 340/12.32 |
| 2012/0139489 | A1 | 6/2012 | Gaul et al. |
| 2013/0099744 | A1 * | 4/2013 | Falk .................... B60L 11/1816 320/109 |
| 2013/0141042 | A1 * | 6/2013 | Kilb ........................ B60L 3/04 320/109 |
| 2014/0103872 | A1 * | 4/2014 | Ichikawa ................ B60L 1/006 320/108 |
| 2014/0254694 | A1 * | 9/2014 | Okada .................... H04B 3/548 375/258 |
| 2015/0210172 | A1 * | 7/2015 | Kanayama .......... B60L 11/1809 320/109 |

FOREIGN PATENT DOCUMENTS

| | | |
|---|---|---|
| DE | 10 2009 025 303 A1 | 12/2010 |
| JP | 2003-175711 A | 6/2003 |
| JP | 2006-262570 A | 9/2006 |
| JP | 2008-061432 A | 3/2008 |
| JP | 2009-171642 A | 7/2009 |
| JP | 2010-035277 A | 2/2010 |
| JP | 2010-142001 A | 6/2010 |
| JP | 2011-083156 A | 4/2011 |
| JP | 2011-130589 A | 6/2011 |
| WO | 2010/009502 A1 | 1/2010 |

OTHER PUBLICATIONS

International Search Report for PCT/JP2012/004385 (in English), mailed Sep. 18, 2012 (2 pages).
English Translation of Chinese Search Report dated May 6, 2015, for corresponding CN Application No. 201280034454.X, 3 pages.

* cited by examiner

CHARGING APPARATUS AND VEHICLE

TECHNICAL FIELD

The present invention relates to a charging apparatus for a vehicle and to a vehicle connected to the charging apparatus.

BACKGROUND ART

A power supply apparatus for an electric vehicle which charges the electric vehicle is configured to include: a charging apparatus that has a plurality of charging cables; and an electrical power supply section that supplies electrical power to each of the charging cables individually, in order to charge a plurality of electric vehicles at one place.

That is, when an electric vehicle is connected to a charging cable, an electric vehicle identification signal of the electric vehicle is first transmitted to the electrical power supply section via the charging cable. Subsequently, the electrical power supply section verifies the electric vehicle identification signal. Thereafter, the electrical power supply section charges the electric vehicle via the charging cable (for example, PTL 1).

CITATION LIST

Patent Literature

PTL 1
Japanese Patent Application Laid-Open No. 2010-142001

SUMMARY OF INVENTION

Technical Problem

The problem with the aforementioned example in the related art is that charging is not appropriately performed in a case where a plurality of electric vehicles are connected to the charging apparatus.

That is, since the charging apparatus has a plurality of charging cables, there is a case where a plurality of electric vehicles are connected to the charging apparatus at the same time. At this time, electric vehicle identification signals (high frequency signals) transmitted to the electrical power supply section via the respective charging cables interfere with each other and are subject to crosstalk due to leaked electric waves caused by the respective electric vehicle identification signals. As a result, there is a problem in that the electrical power supply section cannot determine to which one of the charging cables the electric vehicle that has transmitted the electric vehicle identification signal received by the charging apparatus is connected, and cannot perform charging, appropriately.

An object of the present invention is to appropriately perform a charge even in a case where a plurality of electric vehicles are connected to a charging apparatus.

Solution to Problem

In order to achieve the abovementioned object, a charging apparatus according to an aspect of the present invention is an apparatus that charges a first vehicle including first identification information and a second vehicle including second identification information, the apparatus including: a first communication line that is connected to the first vehicle; a second communication line that is connected to the second vehicle; a voltage detection section that detects a first voltage pattern corresponding to the first identification information via the first communication line and that detects a second voltage pattern corresponding to the second identification information via the second communication line; and a communication section that communicates with the first vehicle using the first identification information and that communicates with the second vehicle using the second identification information.

A vehicle according to an aspect of the present invention is a vehicle that communicates with a charging apparatus via a communication line and that includes identification information, the vehicle including: a transmission section that transmits a voltage pattern corresponding to the identification information to the charging apparatus; and a communication section that communicates with the charging apparatus using the identification information.

Advantageous Effects of Invention

According to the charging apparatus of the present invention, identification information of a vehicle is provided to the charging apparatus using a voltage pattern, and thus, no crosstalk occurs when the charging apparatus receives identification information from a plurality of vehicles. As a result, the charging apparatus can appropriately determine that the identification signal received by the charging apparatus is transmitted from a vehicle connected to which one of the power supply lines, and by performing communication using the identification information, can perform appropriate communication in which communication with the first vehicle is discriminated from communication with the second vehicle, and appropriate charging.

In the vehicle according to the present invention, the vehicle transmits the voltage pattern corresponding to the identification information to the charging apparatus using the transmission section of the vehicle and communicates with the charging apparatus using the identification information shared with the charging apparatus. Thus, no crosstalk of the identification information occurs in the charging apparatus even in a case where another vehicle is connected to the charging apparatus. Performing communication using the identification information enables communication in which communication between the charging apparatus and a vehicle and communication between the charging apparatus and another vehicle are discriminated from each other.

DESCRIPTION OF EMBODIMENTS (Embodiment 1)

Figure 1:
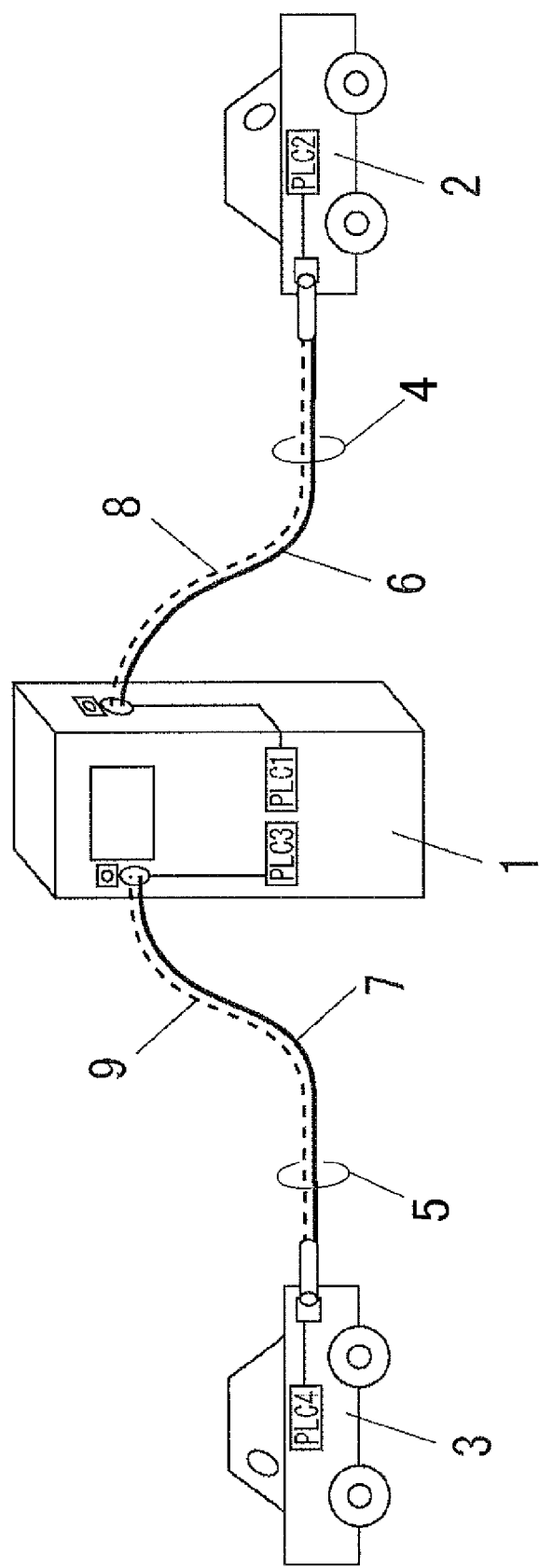
FIG. 1 is a diagram illustrating a configuration of a charging apparatus according to Embodiment 1.

FIG. 1 is a diagram illustrating a configuration of a charging apparatus according to Embodiment 1.

In FIG. 1, for example, reference numeral 1 denotes a charging apparatus installed at an existing gas station, supermarket, home or the like. Charging apparatus 1 includes a plurality of charging cables 4 and 5 for charging apparatus 1 to enable charging of a plurality of electric vehicles 2 and 3 at the same time.

Charging cable 4 is configured to include power supply line 6 for charging electric vehicle 2 and pilot line 8 for detecting that electric vehicle 2 is connected to charging apparatus 1 via power supply line 6.

In addition, charging cable 5 is configured to include power supply line 7 for charging electric vehicle 3 and pilot line 9 for detecting that electric vehicle 3 is connected to charging apparatus 1 via power supply line 7.

Figure 2:
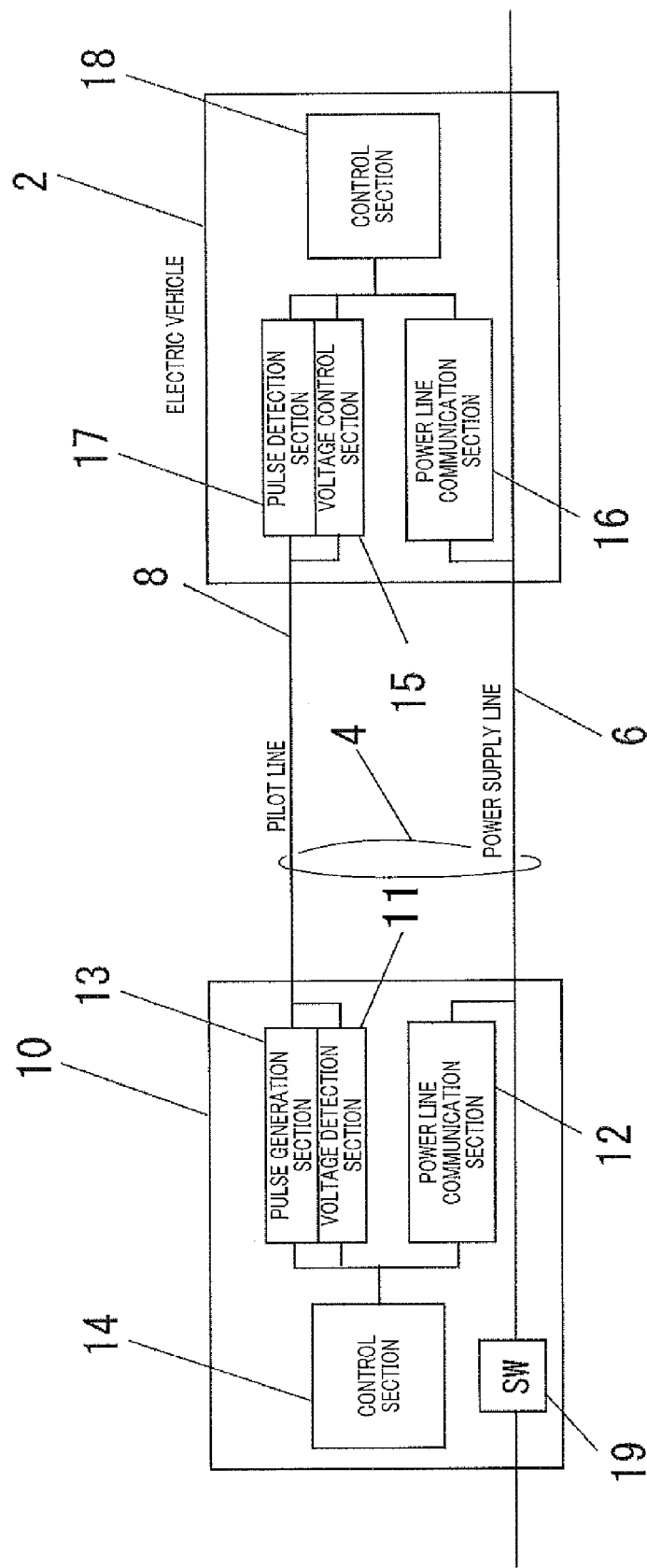
FIG. 2 is a control block diagram of the charging apparatus and an electric vehicle according to Embodiment 1.

FIG. 2 is a control block diagram illustrating the charging apparatus and the electric vehicle according to Embodiment 1.

FIG. 2 illustrates control blocks of electrical power supply section 10 that individually supplies electrical power to electric vehicle 2 via charging cable 4 and control blocks of electric vehicle 2. Electrical power supply section 10 is housed in charging apparatus 1. Electric vehicle 3 that is connected to charging cable 5 and an electrical power supply section for charging electric vehicle 3 (not illustrated) include the same configurations as electric vehicle 2 and electrical power supply section 10, respectively. Accordingly, hereinafter, only charging of electric vehicle 2 by electrical power supply section 10 will be described. Electrical power supply section 10 may be configured to supply electrical power to electric vehicle 3 via charging cable 5.

Electrical power supply section 10 for charging electric vehicle 2 includes: voltage detection section 11 that detects identification information of electric vehicle 2 via pilot line 8; power line communication section (hereinafter, may be referred to as PLC) 12 that performs data communication with electric vehicle 2 in a state where the identification information of electric vehicle 2 obtained by voltage detection section 11 is added to the data communication; pulse generation section 13 that supplies a pulse signal to electric vehicle 2 via pilot line 8; and control section 14 that is connected to voltage detection section 11, power line communication section 12 and pulse generation section 13.

Voltage detection section 11 detects a voltage of pilot line 8.

Power line communication section 12 authenticates electric vehicle 2. Power line communication section 12 performs data communication with power line communication section 16 via power supply line 6.

Pulse generation section 13 generates a pulse and transmits the generated pulse to pilot line 8.

Control section 14 sets a pulse to be transmitted and controls pulse generation section 13 in such a manner that the set pulse is generated. Control section 14 recognizes a voltage fluctuation pattern based on the voltage detected by voltage detection section 11. Control section 14 controls charging in accordance with the recognized voltage fluctuation pattern. Control section 14 determines whether or not charging cable 4 is connected. That is, control section 14 verifies connection of electric vehicle 2 and authenticates electric vehicle 2. Control section 14 controls the data communication performed by power line communication section 12.

In addition, electric vehicle 2 includes: voltage control section 15 that transmits the identification information of electric vehicle 2 to voltage detection section 11 of electrical power supply section 10 via pilot line 8; power line communication section 16 that performs data communication with power line communication section 12 in a state where the identification information of electric vehicle 2 generated by voltage control section 15 is added to the data communication; pulse detection section 17 that detects the pulse in pilot line 8; and control section 18 that is connected to voltage control section 15, power line communication section 16 and pulse detection section 17.

Voltage control section 15 changes a voltage according to a charging sequence.

Power line communication section 16 authenticates electrical power supply section 10. Power line communication section 16 performs data communication with power line communication section 12 via power supply line 6.

Pulse detection section 17 detects a pulse transmitted from pulse generation section 13 via pilot line 8.

Control section 18 recognizes a pulse detected by pulse detection section 17 and determines a voltage fluctuation pattern. Control section 18 controls voltage control section 15 in such a manner that the determined voltage fluctuation pattern is transmitted and controls charging. Control section 18 controls the data communication performed by power line communication section 16.

The identification information of electric vehicle 2 includes any one of or a plurality of an international manufacturer identifier, a vehicle attribute, a model year, a plant code, a vehicle number, a vehicle body number, and a manufacturing serial number, for example.

Electric vehicles 2 and 3 have different manufacturing numbers each containing a vehicle body number and a manufacturer. Accordingly, when the manufacturing number is used as identification information, the identification information replied from electric vehicles 2 and 3 are different from each other.

Figure 3:
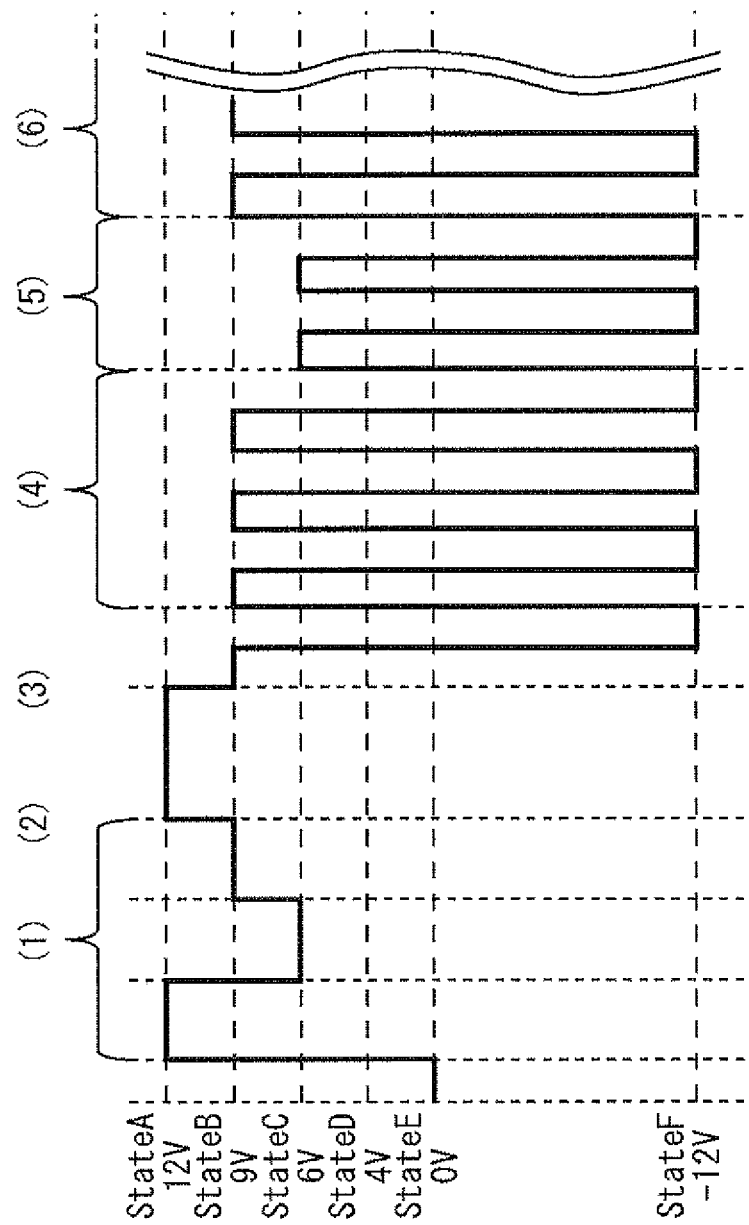
FIG. 3 is a diagram of voltage waveforms on a pilot line according to Embodiment 1.
Figure 4:
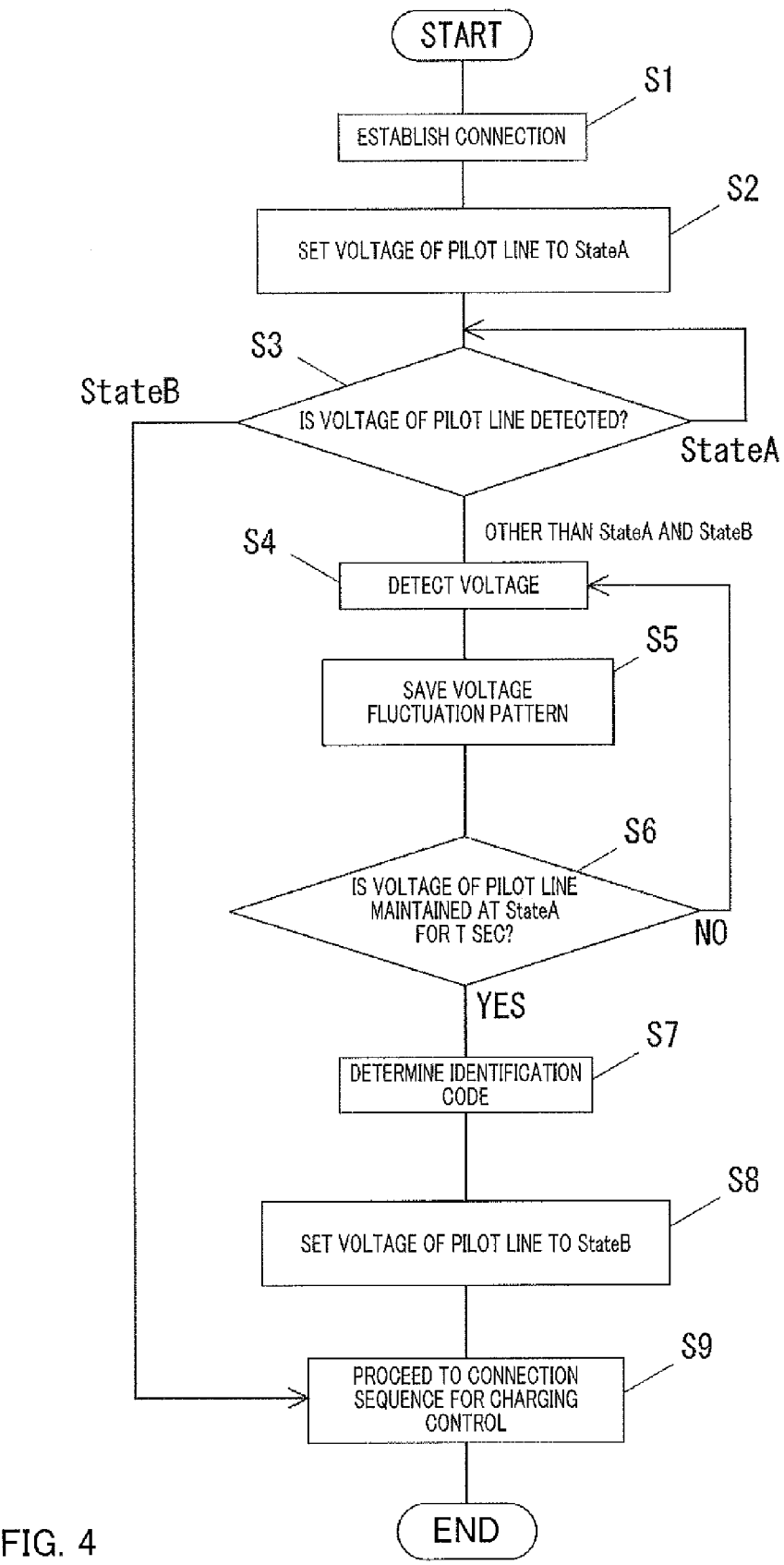
FIG. 4 is a flowchart illustrating a charging operation of the charging apparatus according to Embodiment 1.
Figure 5:
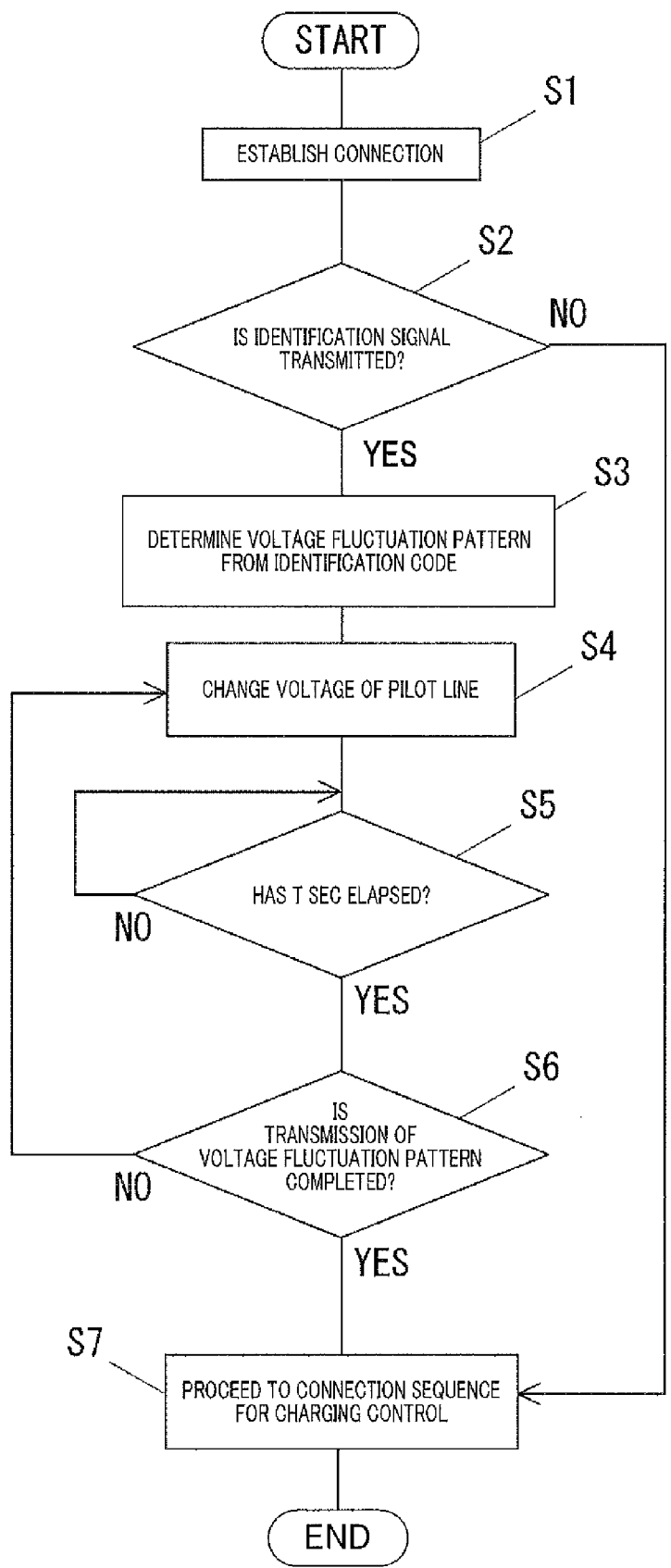
FIG. 5 is a flowchart illustrating an operation of charging the electric vehicle according to Embodiment 1.

Subsequently, a charging operation to be performed when a plurality of vehicles including electric vehicles 2 and 3 are connected to charging apparatus 1 via charging cables 4 and 5 will be described with reference to FIGS. 3 to 5. FIG. 3 is a diagram of voltage waveforms on a pilot line according to Embodiment 1. FIG. 4 is a flowchart illustrating a charging operation of the charging apparatus according to Embodiment 1. FIG. 5 is a flowchart illustrating an operation of charging the electric vehicle according to Embodiment 1.

When electric vehicle 2 is connected to charging apparatus 1 via charging cable 4 (S1 in FIG. 4), control section 14 of electrical power supply section 10 sets a voltage of pilot line 8 to StateA (for example, 12V) via pulse generation section 13 (S2 in FIGS. 3 and 4).

Electric vehicle 2 that is connected to the charging apparatus via charging cable 4 (S1 in FIG. 5) determines whether or not control section 18 thereof transmits (replies) an identification signal to control section 14 of electrical power supply section 10 (S2 in FIG. 5)

When electric vehicle 2 determines to transmit the identification information to charging apparatus 1 (YES in S2 of FIG. 5), control section 18 determines a voltage fluctuation pattern of pilot line 8 based on the identification information of electric vehicle 2 (S3 in FIG. 5). For example, as illustrated in (1) of FIG. 3, voltage control section 15 fluctuates a voltage applied to pilot line 8 according to the control of control section 18 (S4 in FIG. 5).

As an example, in FIG. 3, since the identification information of electric vehicle 2 is "635," voltage control section 15 fluctuates the voltage of pilot line 8 in a pattern of StateA to StateC to StateB to StateA. Accordingly, electric vehicle 2 transmits identification information (identification ID) "635" to electrical power supply section 10.

Thereafter, electric vehicle 2 waits until T sec elapses (S5 in FIG. 5) and verifies whether or not the transmission of the voltage fluctuation pattern (from StateA to StateC to StateB to StateA) is completed (S6 in FIG. 5) after T sec elapses (YES in S5 of FIG. 5). When electric vehicle 2 verifies that the transmission of the voltage fluctuation pattern is completed (YES in S6 of FIG. 5), electric vehicle 2 moves into a connection sequence for a charging control (S7 in FIG. 5). When electric vehicle 2 does not verify that the transmission of the voltage fluctuation pattern is completed (NO in S6 of FIG. 5), electric vehicle 2 returns the process to S4 in FIG. 5.

On the other hand, voltage detection section 11 of electrical power supply section 10 monitors whether or not the voltage fluctuation pattern (from StateA to StateC to StateB to StateA) of pilot line 8 is detected (S3 in FIG. 4). When electrical power supply section 10 detects a voltage fluctuation pattern other than StateA and StateB (other than StateA and StateB in S3 of FIG. 4), electrical power supply section 10 saves the voltage fluctuation patterns (S5 in FIG. 4).

Subsequently, as illustrated in (2) of FIG. 3, control section 14 of electrical power supply section 10 determines whether or not a voltage of pilot line 8 is maintained at StateA (12 V) for T sec (S6 in FIG. 4). When control section 14 verifies that the voltage of pilot line 8 is maintained at StateA (12 V) for T sec (YES in S6 of FIG. 4), control section 14 confirms that the identification information of electric vehicle 2 is "635" (S7 in FIG. 4).

Thereafter, as illustrated in (3) of FIG. 3, after control section 14 verifies that charging cable 4 is securely connected to electric vehicle 2, control section 14 sets the voltage of pilot line 8 to StateB (9 V) via pulse generation section 13 (S8 in FIG. 4).

Subsequently, electrical power supply section 10 moves into a connection sequence for a charging control (S9 in FIG. 4).

When electrical power supply section 10 detects the voltage fluctuation pattern of StateA in S3 of FIG. 4 (StateA in S3 of FIG. 4), electrical power supply section 10 repeats the process of S3 in FIG. 4. In addition, when electrical power supply section 10 detects the voltage fluctuation pattern of StateB in S3 of FIG. 4 (StateB in S3 of FIG. 4), electrical power supply section 10 directly proceeds to the process of S9 in FIG. 4.

In this way, the identification information of electric vehicle 2 can be shared with electrical power supply section 10 of charging apparatus 1.

Thus, data communication can be performed thereafter between power line communication section 12 of charging apparatus 1 and power line communication section 16 of electric vehicle 2 using the identification information of electric vehicle 2. As a result, even in a case where a plurality of electric vehicles which are electric vehicles 2 and 3 are connected to charging apparatus 1, appropriate charging is performed.

The identification information of electric vehicle is used as a data identifier or a cryptographic key for data in the data communication. Accordingly, data communication between charging apparatus 1 and electric vehicle 2 can be discriminated from data communication between charging apparatus 1 and electric vehicle 3. As a result, appropriate data communication can be performed between the charging apparatus and the plurality of electric vehicles.

That is, in Embodiment 1, control section 18 of electric vehicle 2 controls voltage control section 15, and thus, voltage control section 15 generates identification information using a voltage fluctuation pattern. In addition, electrical power supply section 10 of charging apparatus 1 detects, via voltage detection section 11, the voltage fluctuation pattern transmitted from voltage control section 15. Control section 14 detects the identification information based on the detected voltage fluctuation pattern. Accordingly, even in the case where the plurality of electric vehicles 2 and 3 are connected to charging apparatus 1, interference between identification information of electric vehicles 2 and 3 does not occur. As a result, electrical power supply section 10 can appropriately determine that the received electric vehicle identification signal is transmitted from which one of electric vehicles 2 and 3 each connected to one of charging cables 4 and 5, and thus, charging can be performed appropriately.

As such, when charging apparatus 1 and electric vehicles 2 and 3 are connected to each other, and furthermore, charging specifications or charging fee payment conditions or the like of connected electric vehicles 2 and 3 are transmitted between power line communication sections 12 and 16 via power supply line 6, control section 14 of electrical power supply section 10 fluctuates a voltage of pilot line 8 via pulse generation section 13 as illustrated in (4) of FIG. 3.

In (4) of FIG. 3, electrical power supply section 10 of charging apparatus 1 notifies electric vehicle 2 of the current rating using a duty ratio. That is, pulse generation section 13 changes a supply voltage duty, and thus, electrical power supply section 10 notifies control section 18 of the rating as charging apparatus 1 via pulse detection section 17 of electric vehicle 2.

As illustrated in (5) of FIG. 3, when control section 18 of electric vehicle 2 receives the rating of (4) of FIG. 3, control section 18 sets the voltage of pilot line 8 to StateC (6V) via voltage control section 15. That is, when electric vehicle 2 receives the current rating and completes charging preparation, voltage control section 15 sets the voltage of pilot line 8 to StateC (6V).

The voltage state in pilot line 8 is transmitted to control section 14 via voltage detection section 11 of electrical power supply section 10. As a result, control section 14 closes switch 19 in FIG. 2 and starts charging electric vehicle 2 via power supply line 6.

As illustrated in (6) of FIG. 3, upon completion of charging of electric vehicle 2, control section 18 of electric vehicle 2 sets the voltage of pilot line 8 to StateB (9V) via voltage control section 15. That is, upon completion of charging, voltage control section 15 sets the voltage of pilot line 8 to StateB (9V).

When voltage detection section 11 detects StateB (9V), electrical power supply section 10 stops supplying electrical power.

In addition, the state of (6) of FIG. 3 is transmitted to control section 14 via voltage detection section 11 of electrical power supply section 10. As a result, control section 14 opens switch 19 in FIG. 2 and ends the charging of electric vehicle 2 via power supply line 6.

Figure 6:
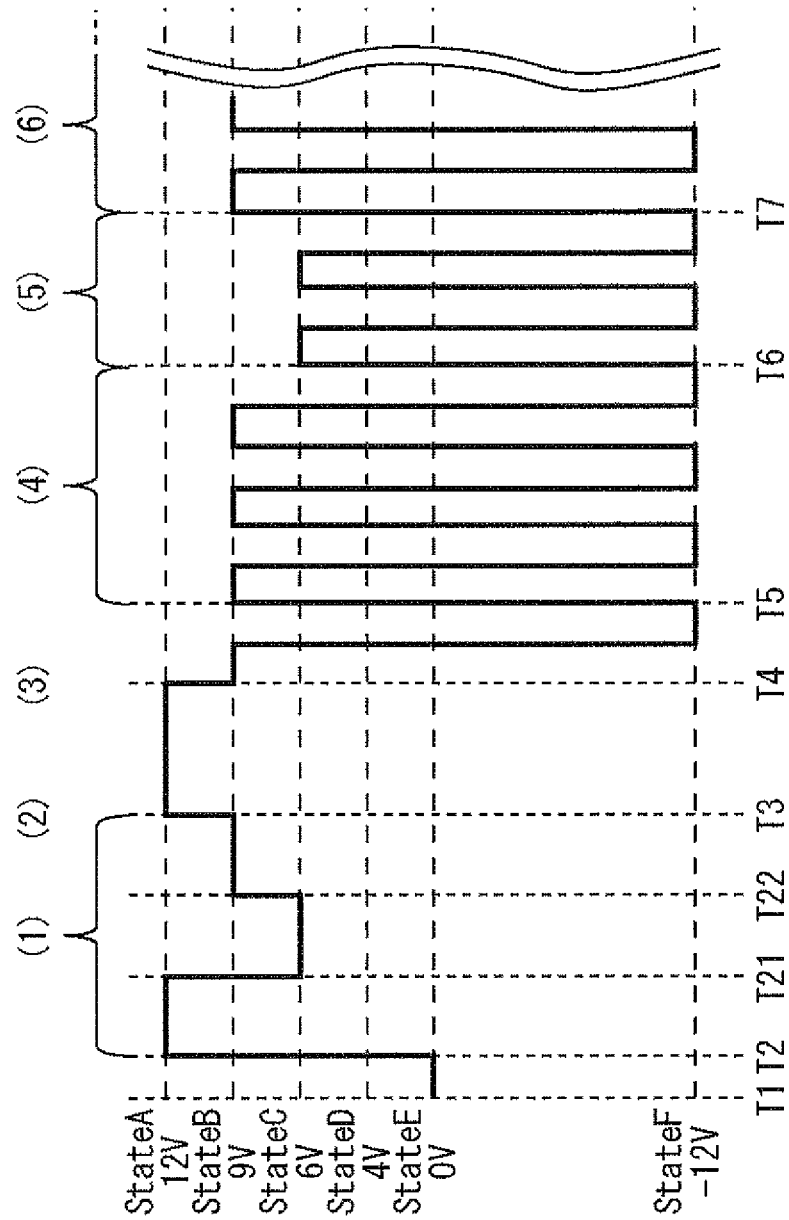
FIG. 6 is a diagram of operation waveforms according to Embodiment 1.

FIG. 6 is a diagram of operation waveforms according to Embodiment 1. FIG. 6 illustrates an example of a transmission time of the voltage fluctuation pattern in FIG. 3. When periods between T21 and T22 and between T22 and T3 are set to be T (T22−T21 T, T3−T22=T) in the area of (1) of FIG. 6, periods between T2 and T21 and between T3 and T4 are set to be T or longer (T21−T2≥T, T4−T3≥T).

T denotes a time shorter than 2 sec and longer than 1 ms (1 ms<T<2 sec), but a time between T21 and T3 is variable depending on the amount of identification information to be transmitted.

Herein, an example of a transmission time of a voltage fluctuation pattern will be described ht more detail with reference to FIG. 6. As described above, when periods between T21 and T22 and between T22 and T3 are set to be T in the area of (1) of FIG. 6, periods between T2 and T21 and between T3 and T4 are set to be T or longer. Accordingly, since voltage fluctuation periods are long before and after the voltage fluctuation pattern corresponding to the identification information of electric vehicle 2 or 3, electric vehicle 2 or 3 can easily notify charging apparatus 1 of the start and end of the identification information. Accordingly, charging apparatus 1 can discriminate which portion in the voltage fluctuation pattern is the identification information, avoid receiving erroneous identification information and perform charging appropriately.

A period between T3 and T4 which indicates the end of the identification information of electric vehicle 2 or 3 (hereinafter, referred to as "first voltage fluctuation period Te") is different from a period between T21 and T22 or between T22 and T3 which indicates at least a portion of the identification information of electric vehicle 2 or 3 (hereinafter, referred to as "second voltage fluctuation period T"). That is, electric vehicle 2 or 3 generates a voltage fluctuation pattern in such a manner that the first voltage fluctuation period Te changes in conjunction with the second voltage fluctuation period T. Since charging apparatus 1 is notified of the end of the identification information when voltage detection section 11 of detects the first voltage fluctuation period Te, charging apparatus 1 can determine the identification information.

Similarly, the second voltage fluctuation period T is different from the period between T2 and T21 which indicates the start of the identification information of electric vehicle 2 or 3 (hereinafter, referred to as "third voltage fluctuation period Ts"). That is, electric vehicle 2 or 3 generates a voltage fluctuation pattern in such a manner that the third voltage fluctuation period Ts changes in conjunction with the second voltage fluctuation period T. Since charging apparatus 1 is notified of the start of the identification information when voltage detection section 11 detects the third voltage fluctuation period Ts, charging apparatus 1 can start an operation of receiving the identification information.

In addition, in Embodiment 1, electric vehicle 2 or 3 generates a voltage fluctuation pattern in such a manner that the first voltage fluctuation period Te and the third voltage fluctuation period Ts are longer than the second voltage fluctuation period T. Accordingly, charging apparatus 1 can more reliably receive the identification information.

In addition, electric vehicle 2 or 3 may generate a voltage fluctuation pattern in such a manner that the first voltage fluctuation period Te and the third voltage fluctuation period Ts are shorter than the second voltage fluctuation period T. Accordingly, since a time required for identification information transmission can be shortened, charge of electric vehicle 2 or 3 can be quickly started.

In the first voltage fluctuation period Te and the third voltage fluctuation period Ts, a voltage applied to pilot line 8 by electric vehicle 2 or 3 may be a predetermined value (for example, 12V). Accordingly, charging apparatus 1 can judge the start and end of identification information transmission using not only a voltage fluctuation period but also a voltage value. Since the start and end of the identification information is more apparent, charging apparatus 1 can avoid receiving erroneous identification information and can perform charging appropriately.

In addition, in the first voltage fluctuation period Te and the third voltage fluctuation period Ts, the value of a voltage applied to pilot line 8 by electric vehicle 2 or 3 may be variable. In this case, in the first voltage fluctuation period Te and the third voltage fluctuation period Ts, a voltage applied to pilot line 8 preferably corresponds to at least a portion of the identification information. Accordingly, electric vehicle 2 or 3 can notify charging apparatus 1 of not only the start and end of the identification information transmission but also the identification information itself in the first voltage fluctuation period Te and the third voltage fluctuation period Ts. As a result, the identification information can be efficiently transmitted, and a time required until charging starts can be shortened.

In addition, it is preferable that the first voltage fluctuation period Te be not at least 2 times the second voltage fluctuation period T. Even in a case where the same level of voltage is applied twice in succession (for example, periods (=2T) between T2 and T21 and between T21 and T22 are at StateA) while the identification information is transmitted, charging apparatus 1 can avoid erroneously detecting the end of the identification information transmission in a case of 2 T≠Te. Accordingly, charging apparatus 1 can start a connection sequence after T4 at appropriate timing and can eventually start supplying electrical power.

It is more preferable that the first voltage fluctuation period Te be not a multiple of the second voltage fluctuation period T. When voltage detection section 11 of charging apparatus 1 detects the first voltage fluctuation period Te which is not two times or a multiple of the second voltage fluctuation period T, control section 14 of charging apparatus 1 determines the identification information. Accordingly, even in the case where the same level of voltage is applied in succession, charging apparatus 1 can start the connection sequence after T4 at appropriate timing.

As such, electric vehicle 2 generates a voltage pattern (first voltage pattern) for a notification of the identification information and generates a voltage pattern (third voltage pattern) for a notification of the start and end of the identification information transmission. In other words, electric vehicle 2 generates the first voltage pattern and the third voltage pattern which is different from the first voltage pattern. Similarly, electric vehicle 3 generates a voltage pattern (second voltage pattern) for a notification of the identification information and generates a voltage pattern (fourth voltage pattern) for a notification of the start and end of the identification information transmission. In other words, electric vehicle 3 generates the second voltage pattern and the fourth voltage pattern which is different from the second voltage pattern.

As such, electric vehicle 2 or 3 changes the voltage fluctuation pattern at the time of the start or end of the identification information transmission from the voltage fluctuation pattern while the identification information is transmitted, and thus, electric vehicle 2 or 3 can notify charging apparatus 1 of the start or end of the identification information transmission. Accordingly, charging apparatus 1 can discriminate which portion in the voltage fluctuation pattern is the identification information, avoid receiving erroneous identification information, and perform charging appropriately.

In addition, when voltage detection section 11 of charging apparatus 1 detects the third or fourth voltage pattern, control section 14 of charging apparatus 1 determines the identification information (S7 in FIG. 4). That is, control section 14 of charging apparatus 1 stores the received identification information on a memory (not illustrated). Charging apparatus 1 advances through a sequence before charging is started, and electrical power supply section 10 of charging apparatus 1 supplies electrical power to electric vehicle 2 or 3. In FIG. 6, a voltage pattern between T21 and T3 is the first or second voltage pattern, and voltage patterns between a T2-to-T21 period and a T3-to-T4 period are the third or fourth voltage pattern.

The third and fourth voltage patterns which correspond to the start or end of the identification information transmission may be notified in other manners than a change in the voltage fluctuation period as described above. For example, when the transmission of the identification information is started or ended, electric vehicle 2 or 3 can generate the third and fourth voltage patterns in such a manner that the third and fourth voltage patterns become a voltage fluctuation pattern (for example, changed in a sequence of StateA to StateB to StateC), a voltage value (for example, −12V) or a voltage fluctuation range (for example, a fluctuation range between StateA and StateD is 12V) which is not used for the transmission of the identification information. Even in this case, charging apparatus 1 can detect the start or end of the identification information transmission. Alternatively, the predetermined end of the identification information transmission may be notified.

A voltage value in each voltage fluctuation period T or a voltage fluctuation range may be used as a method of the transmission of the identification information. That is, in a case where a voltage is fluctuated into StateC, identification information when a voltage is changed from StateA to StateC may be different from identification information when a voltage is changed from StateB to StateC. Accordingly, a large amount of information can be notified with a small amount of voltage.

In addition, when charging apparatus 1 cannot receive the identification information, charging apparatus 1 may change a voltage (12V) which is continuously applied to pilot line 8 from S2 of FIG. 4. Otherwise, charging apparatus 1 may cancel the application of a voltage to pilot line 8. Accordingly, charging apparatus 1 can easily notify electric vehicle 2 or 3 of a failure of the identification information transmission. That is, electric vehicle 2 or 3 can re-transmit the identification information or take countermeasures such as a notification of abnormality to a user.

In addition, for example, when charging apparatus 1 can correctly receive the identification information, charging apparatus 1 may change the duty ratio in a period between T4 and T5 in response to the reception of the identification information. Charging apparatus 1 can notify electric vehicle 2 or 3 that the identification information is received by changing the duty ratio after charging apparatus 1 receives the identification information and before charging apparatus 1 notifies electric vehicle 2 or 3 of the current rating using the duty ratio.

Before charging of electric vehicle 2 or 3 starts, information other than the identification information and the current rating may be transmitted between charging apparatus 1 and electric vehicle 2 or 3.

According to the embodiment, the identification information of the vehicle is supplied to the charging apparatus using the voltage pattern, and thus, no crosstalk occurs when the charging apparatus receives identification information from the plurality of vehicles. As a result, the charging apparatus can appropriately determine that the identification signal received by the charging apparatus is transmitted from a vehicle connected to which one of the power supply lines, and by performing communication using the identification information, can perform appropriate communication in which communication with the first vehicle is discriminated from communication with the second vehicle, and appropriate charging.

(Embodiment 2)

Figure 7:
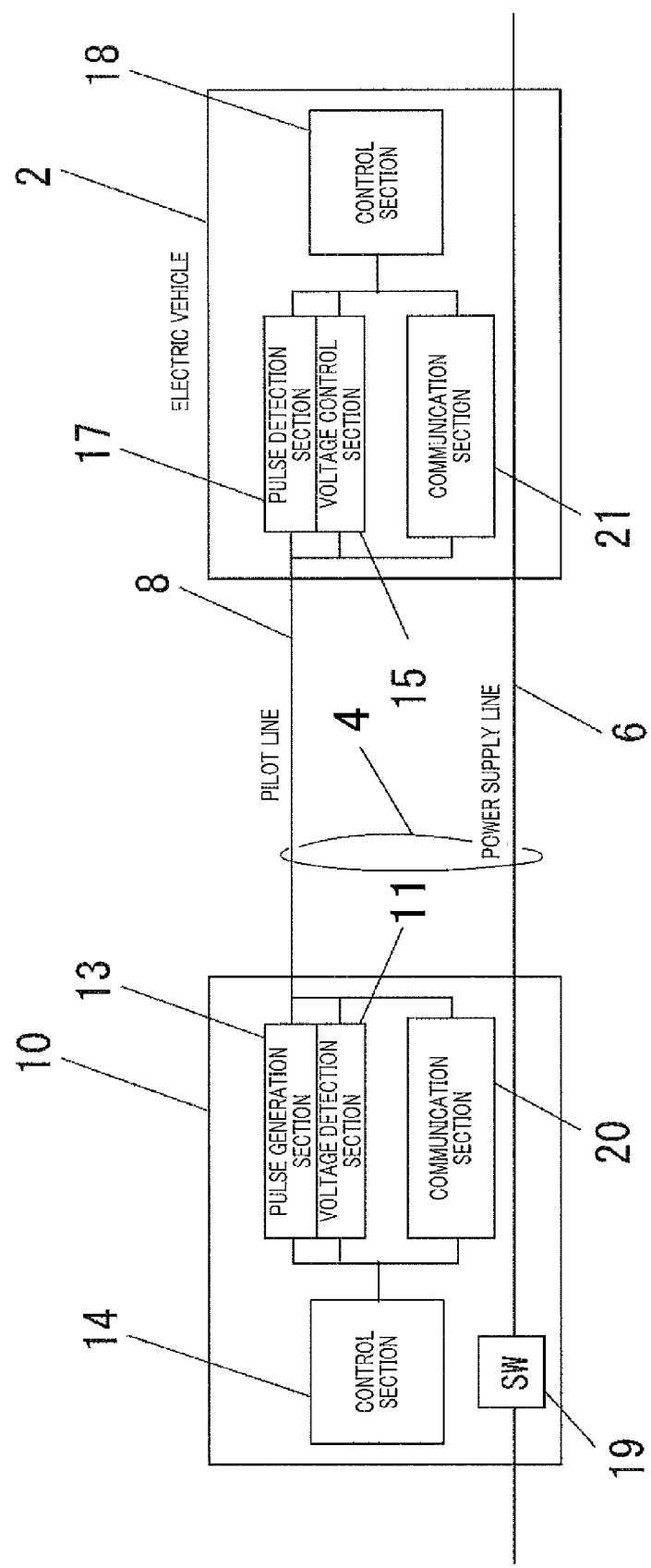
FIG. 7 is a control block diagram according to Embodiment 2.

FIG. 7 is a control block diagram according to Embodiment 2. In Embodiment 2, communication between charging apparatus 1 and electric vehicle 2 is performed via pilot line 8.

That is, in Embodiment 2, communication sections 20 and 21 that perform communication via pilot line 8 are provided instead of power line communication sections 12 and 16 that perform communication via power supply line 6. Communication functions of communication sections 20 and 21 are the same as the communication functions of power line communication sections 12 and 16 illustrated in Embodiment 1. In FIG. 7, portions with the same configuration as in FIG. 2 will be given the same reference numerals, and descriptions thereof will be omitted.

Communication section 20 authenticates electric vehicle 2. Communication section 20 performs data communication with communication section 21 via pilot line 8.

Communication section 21 authenticates electrical power supply section 10. Communication section 21 performs data communication with communication section 20 via pilot line 8.

In the embodiment, since other structures and operations are the same as in FIGS. 1 to 6, descriptions thereof will be omitted.

According to the embodiment, since communication is performed via pilot line 8, while the same effects as those of Embodiment 1 are obtained, communication can be performed in the simple configuration compared to the communication via the power supply line.

Embodiments 1 and 2 illustrate the examples where charging apparatus 1 is applied to the electric vehicle, but charging apparatus 1 can be applied to even a plug-in hybrid vehicle or other vehicles that are driven by conversion of other electricity to a driving force.

The disclosure of Japanese Patent Applications No. 2011-155336, filed on Jul. 14, 2011, including the specification, drawings and abstract, is incorporated herein by reference in its entirety.

INDUSTRIAL APPLICABILITY

In the present invention described above, identification information generated by a voltage control section of an electric vehicle is supplied to a voltage detection section of a power supply apparatus for the electric vehicle via a pilot line, and thus, the identification information of the electric vehicle can be shared between the electric vehicle and the power supply apparatus for the electric vehicle.

Thus, data communication can be performed thereafter using the identification information of the electric vehicle between a first PLC of the power supply apparatus for the electric vehicle and a second PLC of the electric vehicle. As a result, even in a case where a plurality of electric vehicles are connected to the charging apparatus, charging is performed appropriately.

That is, in the present invention, a second control section of the electric vehicle controls the voltage control section, and thus, identification information is generated by a voltage fluctuation. In addition, the power supply apparatus for the electric vehicle is configured in such a manner that the voltage detection section thereof detects a voltage from the voltage control section and a first control section detects the identification information. Accordingly, even in the case where a plurality of electric vehicles are connected to the charging apparatus, interference between identification information of the electric vehicles does not occur. As a result, an electrical power supply section can appropriately determine that the electric vehicle identification signal received by the charging apparatus is transmitted from an electric vehicle connected to which one of the charging cables, and thus, charging can be performed appropriately.

Therefore, the present invention is expected to be used as a charging apparatus for a vehicle.

REFERENCE SIGNS LIST

1 Charging apparatus
2, 3 Electric vehicle 4, 5 Charging cable
6, 7 Power supply line
8, 9 Pilot line
10 Electrical power supply section
11 Voltage detection section
12 Power line communication section
13 Pulse generation section
14 Control section
15 Voltage control section
16 Power line communication section
17 Pulse detection section
18 Control section
19 Switch
20, 21 Communication section

The invention claimed is:

1. A charging apparatus that charges a first vehicle including first identification information and a second vehicle including second identification information, the charging apparatus comprising:
a first communication line that is connectable to the first vehicle;
a second communication line that is connectable to the second vehicle;
a voltage detector that, in operation, detects a first voltage pattern corresponding to the first identification information via the first communication line and that, in operation, detects a second voltage pattern corresponding to the second identification information via the second communication line;
a communicator that, in operation, communicates with the first vehicle using the first identification information and that, in operation, communicates with the second vehicle using the second identification information;
a first power supply line that is connectable to the first vehicle;
a second power supply line that is connectable to the second vehicle; and
an electrical power supply that, in operation, supplies electrical power to the first vehicle via the first power supply line and that, in operation, supplies electrical power to the second vehicle via the second power supply line, wherein
the electrical power supply supplies electrical power to the first vehicle via the first power supply line when the voltage detector detects a third voltage pattern different from the first voltage pattern.

2. The charging apparatus according to claim 1, wherein the voltage detector, in operation, detects the first voltage pattern via the first power supply line instead of the first communication line and detects the second voltage pattern via the second power supply line instead of the second communication line.

3. The charging apparatus according to claim 1, wherein the communicator communicates with the first vehicle using the first identification information as a first identifier and communicates with the second vehicle using the second identification information as a second identifier.

4. The charging apparatus according to claim 1, wherein the communicator performs, with the first vehicle, encrypted communication using the first identification information as a first cryptographic key and performs, with the second vehicle, encrypted communication using the second identification information as a second cryptographic key.

5. The charging apparatus according to claim 1, wherein the voltage detector detects a voltage fluctuation period in the third voltage pattern that is longer than a voltage fluctuation period in the first voltage pattern.

6. The charging apparatus according to claim 5, wherein the voltage detector detects at least a portion of the first identification information from the third voltage pattern.

7. The charging apparatus according to claim 5, wherein the electrical power supply supplies electrical power to the first vehicle via the first power supply line when the voltage detector detects that the voltage fluctuation period of the third voltage pattern is not twice the voltage fluctuation period of the first voltage pattern.

8. The charging apparatus according to claim 1, wherein the third voltage pattern serves as a notification of a start of receipt of the first voltage pattern from the first vehicle.

9. The charging apparatus according to claim 1, wherein the third voltage pattern serves as a notification of an end of receipt of the first voltage pattern from the first vehicle.

10. A vehicle that communicates with a charging apparatus via a communication line and that includes identification information, the vehicle comprising:
a transmitter that, in operation, transmits a first voltage pattern corresponding to the identification information to the charging apparatus;
a communicator that, in operation, communicates with the charging apparatus using the identification information; and
an electrical power port that, in operation, receives electrical power from the charging apparatus, wherein
the electrical power port receives electrical power from the charging apparatus when the transmitter transmits a third voltage pattern, which is different from the first voltage pattern, to the charging apparatus.

11. The vehicle according to claim 10, wherein the communicator, in operation, communicates with the charging apparatus via a power supply line instead of the communication line, the power supply line being connected to the electrical power port.

12. The vehicle according to claim 10, wherein the communicator performs, with the charging apparatus, encrypted communication using the identification information as a cryptographic key.

13. The vehicle according to claim 10, wherein a voltage fluctuation period in the third voltage pattern is longer than a voltage fluctuation period in the first voltage pattern.

14. The vehicle according to claim 13, wherein at least a portion of the identification information is detectable from the third voltage pattern.

15. The vehicle according to claim 13, wherein the electrical power port receives electrical power from the charging apparatus when the voltage fluctuation period of the third voltage pattern is not twice the voltage fluctuation period of the first voltage pattern.

16. The vehicle according to claim 10, wherein the third voltage pattern serves as a notification of a start of transmission of the first voltage pattern.

17. The vehicle according to claim 10, wherein the third voltage pattern serves as a notification of an end of transmission of the first voltage pattern.

* * * * *